June 16, 1936.  L. W. PERAU  2,044,396
BEAN PICK-UP GUARD
Filed Oct. 21, 1935
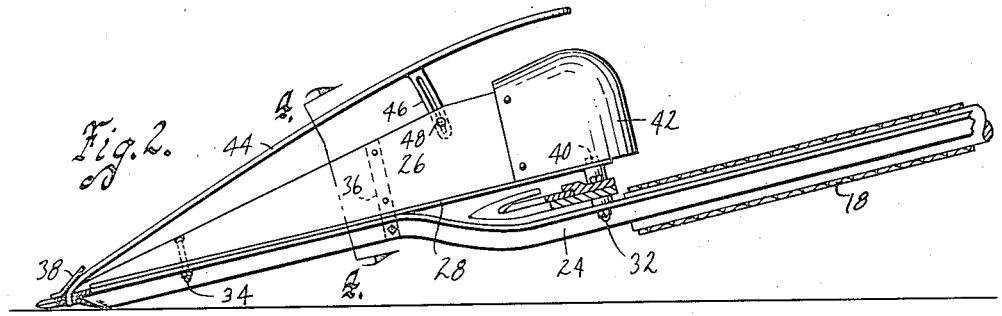
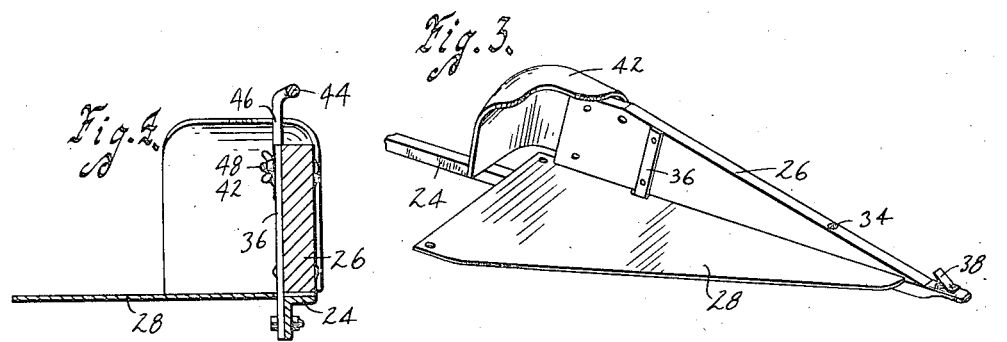
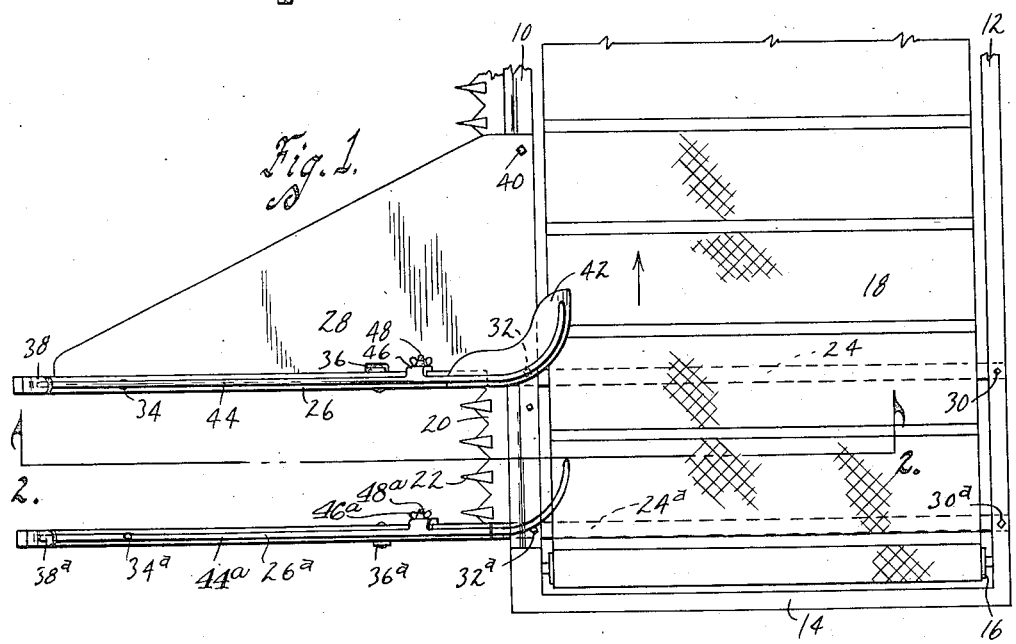
Inventor
Louis W. Perau
by Bair, Freeman & Sinclair
Attorneys
Witness
H. S. Munzenmaier Patented June 16, 1936

2,044,396

UNITED STATES PATENT OFFICE 2,044,396

BEAN PICK-UP GUARD

Louis W. Perau, Lyle, Minn.

Application October 21, 1935, Serial No. 45,973

12 Claims. (Cl. 56—312)

The object of my invention is to provide a bean pick-up guard which is simple, durable and comparatively inexpensive to manufacture.

A further object is to provide a guard designed for attachment to grain binders for harvesting soy bean hay and harvesting soy beans for seeds, the binders as they are designed for grain being entirely unsuitable for this purpose in view of the bean vines spreading over the ground rather than assuming an upstanding position, as wheat, oats and other grain does.

More particularly, it is my object to provide a bean pick-up guard having a vertically arranged guard board which serves the purpose of projecting under the bean vines and picking them up along one side of the rows, a horizontally arranged shield being provided for holding the over-hanging ends of the vines up so that they are not cut off by the binder sickle and left in the field, but are conveyed on to the platform of the binder, thus leaving only about four to six inches of the base of the bean stalk in the field.

Another object is to provide a second guard board arranged on the other side of the bean hill so as to pick up the down vines and serve as a divider operating more effectively than the grain divider provided on the binder.

Another object is to provide an adjustable guard rod on the guard board and a deflector at its rear end for insuring proper movement of the bean vines so that they may be carried by the binder platform without being entangled in the bean pick-up guard or the sickle or any other part of the binder.

With these and other objects in view, my invention consists in the construction, arrangement and combination of the various parts of my device, whereby the objects contemplated are attained, as hereinafter more fully set forth, pointed out in my claims and illustrated in the accompanying drawing, in which:

Figure 1 is a plan view of the outer end of a binder platform showing my bean pick-up guard applied thereto.

Figure 2 is a vertical sectional view on the line 2—2 of Figure 1.

Figure 3 is a perspective view of the guard, certain parts thereof being omitted; and Figure 4 is an enlarged sectional view on the line 4—4 of Figure 2.

On the accompanying drawing, I have used the reference numerals 10, 12 and 14 to indicate a binder platform frame. The outer roller is illustrated at 16 and the platform conveyor at 18.

The binder sickle is illustrated at 20 and the sickle guard at 22.

The essential parts of my bean pick-up guard comprise an arm or frame member 24, a guard board 26 and a shield 28. The arm 24 is preferably formed of angle iron with the rear end thereof secured as by a bolt 30 to the binder platform frame member 12 and secured by a bolt 32 intermediate its length to the frame member 10. The portion of the arm 24 ahead of the bolt 32 is curved upwardly to a position above the sickle guard 22 and then forwardly as shown in Figure 2 and terminates at its forward end in a shoe or runner-like point produced by bending the vertical flange of the angle iron against the horizontal flange.

The guard board 26 is secured to the arm 24 by a bolt 34 adjacent its forward end and a strap iron 36 adjacent its rear end, the strap iron being bolted or riveted to the arm and board.

The guard board 26 is arranged in a vertical plane and is pointed at its forward end, the rear end widening and thereby its upper surface inclining upwardly for raising the bean vines. A piece of strap iron 38 is welded to the forward end of the arm 24 to prevent the vines from catching on the forward end of the guard board 26.

The shield 28 may be made of sheet metal or the like and clamped between the guard board 26 and the arm 24 by the bolt 34. The shield is notched to straddle the bar 36 and the rear end of the shield is secured to the frame member 10 by the bolt 32 and another bolt 40. The purpose of the shield 28 is to carry any over-hanging vines to a position above the sickle and the platform conveyor, thus preventing the over-hanging vines from being cut off by the sickle and left in the field.

At the rear end of the guard board 26 a deflector 42 may be provided formed of sheet metal and curved in the direction of travel of the conveyor 18, as shown in Figure 1. The upper edge of the deflector also may be rounded so as to insure against the bean vines catching thereon.

If the bean vines are not lifted high enough by the guard board 26, they may be lifted to a higher position by a guard rod 44 having its forward end extending loosely through the point at the forward end of the arm 24 and its rear end vertically adjustable realtive to the guard board. Vertical adjustment is secured by the slotted arm 46 and a clamping bolt 48. The rear end of the guard rod 44 is curved in the direction of movement of the conveyor 18, as shown in Figure 1.

The divider board already on the grain binder is used, although I have found that it is difficult to adjust it to a satisfactory working position for picking up the bean vines. Accordingly, a second arm 24a, a second guard board 26a and a second guard rod 44a may be secured to the binder platform frame spaced from the guard board 26 as shown in Figure 1, to serve as a pick-up guard for the bean vines.

The second guard rod 44a has a slotted arm 46a cooperating with a clamp bolt 48a, these parts being similar to the parts 44, 46 and 48 used in connection with the guard board 26. The guard board 26a, however, does not have a shield like the one shown at 42.

By leaving the divider board already on the binder in place, it serves as a divider which, of course, is necessary, although if it fails to act satisfactorily as a pick-up guard, I then use the second guard board 26a and its associated parts. The rod 44a serves as a pick-up rod, while the board 26a spans at least most of the space between the rod and the frame member 24a to prevent foliage and vines from becoming entangled with the guard. In some makes of binders, the divider point on the divider board of the binder can be adjusted to serve as a pick-up guard, but if it fails to answer this purpose, I leave it in place to serve as a divider for separating the rows of vines being cut from the row left standing, and then use the pick-up guard 26a and its associated parts to lift the down vines and properly carry them over the sickle and onto the platform conveyor of the binder.

By making the arms 24 and 24a of about one and one-fourth inch angle iron, they may strike hard obstacles and will spring upwardly or sidewise to clear them, rather than breaking, due to the inherent resiliency of the metal. My bean pick-up guard prevents entrance of the vines into the binder mechanism and improves the tying of the bundles.

Some changes may be made in the construction and arrangement of the parts of my device without departing from the real spirit and purpose of my invention and it is my intention to cover by my claims any modified forms of structure or use of mechanical equivalents, which may be reasonably included within their scope.

I claim as my invention:

1. In a bean pick-up guard for binders, an arm secured to the platform frame of a binder and projecting forwardly from the sickle thereof, a guard board supported thereby in a vertical plane, the forward end of said board being pointed and the rear end thereof widening, and a horizontally arranged shield having a side edge adjacent the bottom of said guard board and a rear edge terminating above the binder platform for carrying bean vines hanging over the guard board to the platform without being cut off by said sickle.

2. In a bean pick-up guard for binders, an arm secured to the platform frame of a binder and projecting forwardly from the sickle thereof, a guard board supported thereby in a vertical plane, the forward end of said board being pointed and the rear end thereof widening, a horizontally arranged shield having a side edge adjacent the bottom of said guard board and a rear edge terminating above the binder platform for carrying bean vines hanging over the guard board to the platform without being cut off by said sickle and a deflector at the rear end of said guard board curving in the direction of travel of said binder platform and terminating thereabove.

3. In a bean pick-up guard for binders, an arm secured to the platform frame of a binder and projecting forwardly from the sickle thereof, a guard board supported thereby in a vertical plane, the forward end of said board being pointed and the rear end thereof widening, a horizontally arranged shield having a side edge adjacent the bottom of said guard board and a rear edge terminating above the binder platform for carrying bean vines hanging over the guard board to the platform without being cut off by said sickle and a guard rod pivoted at the front end of said guard board and secured to the rear end of the guard board for vertical adjustment.

4. In a bean pick-up guard for binders, an arm secured to the platform frame of a binder and projecting forwardly from the sickle thereof, a guard board supported thereby in a vertical plane, the forward end of said board being pointed and the rear end thereof widening, a horizontally arranged shield having a side edge adjacent the bottom of said guard board and a rear edge terminating above the binder platform for carrying bean vines hanging over the guard board to the platform without being cut off by said sickle and a second arm and guard board secured to said platform frame projecting forwardly from said sickle and spaced laterally from said first arm and guard board.

5. In a bean pick-up guard, a guard board arranged in a vertical plane, the forward end thereof being pointed, and the rear end thereof widening, a horizontally arranged shield extending laterally from said guard board and means for mounting said guard board and shield with the guard board projecting forwardly from the sickle of the binder and the rear end of the shield terminating above said sickle.

6. In a bean pick-up guard, a guard board arranged in a vertical plane, the forward end thereof being pointed, and the rear end thereof widening, a horizontally arranged shield extending laterally from said guard board and means for mounting said guard board and shield with the guard board projecting forwardly from the sickle of the binder and the rear end of the shield terminating above said sickle and a deflector at the rear end of said guard board curve in the direction of travel of said binder platform and terminating thereabove.

7. In a bean pick-up guard, a guard board arranged in a vertical plane, the forward end thereof being pointed, and the rear end thereof widening, a horizontally arranged shield extending laterally from said guard board and means for mounting said guard board and shield with the guard board projecting forwardly from the sickle of the binder and the rear end of the shield terminating above said sickle and a second arm and guard board secured to said platform frame projecting forwardly from said sickle and spaced laterally from said first arm and guard board.

8. In a bean pick-up guard, a guard board arranged in a vertical plane, the forward end thereof being pointed, and the rear end thereof widening, a horizontally arranged shield extending laterally from said guard board and means for mounting said guard board and shield with the guard board projecting forwardly from the sickle of the binder and the rear end of the shield terminating above said sickle and a guard rod pivoted at the forward end of said guard board and secured to the rear end of the guard board for vertical adjustment.

9. In a bean pick-up guard, a guard board arranged in a vertical plane, the forward end thereof being pointed, and the rear end thereof widening, a deflector on said rear end extending rearwardly therefrom and curved laterally, a horizontally arranged shield extending laterally from said guard board and means for mounting said guard board and shield with the guard board projecting forwardly from the sickle of the binder and the rear end of the shield terminating above said sickle.

10. In a bean pick-up guard, a guard board arranged in a vertical plane, the forward end thereof being pointed, and the rear end thereof widening, a guard rod pivoted to the forward end thereof and having its rear end vertically adjustable relative to said guard board, a horizontally arranged shield extending laterally from said guard board and means for mounting said guard board and shield with the guard board projecting forwardly from the sickle of the binder and the rear end of the shield terminating above said sickle.

11. In a bean pick-up guard, a guard board arranged in a vertical plane, the forward end thereof being pointed, and the rear end thereof widening, a horizontally arranged shield extending laterally from said guard board and means for mounting said guard board and shield with the guard board projecting forwardly from the sickle of the binder and the rear end of the shield terminating above said sickle, a second and similar guard board spaced laterally from said first guard board and means for mounting said second guard board in position projecting forwardly from said sickle.

12. In a bean pick-up guard, a guard board arranged in a vertical plane, the forward end thereof being pointed and the rear end thereof widening, a horizontally arranged shield extending laterally from said guard board, a bar connected with the lower edge of said guard board and with one side edge of said shield for mounting the board and shield on a binder platform frame and a cover element on the forward end of said bar extending over the point of said guard board.

LOUIS W. PERAU.